(12) United States Patent
Kim et al.

(10) Patent No.: US 11,791,097 B2
(45) Date of Patent: Oct. 17, 2023

(54) CERAMIC ELECTRONIC COMPONENT

(71) Applicant: SAMSUNG ELECTRO-MECHANICS CO., LTD., Suwon-si (KR)

(72) Inventors: Su Been Kim, Suwon-si (KR); Jong Hoon Yoo, Suwon-si (KR); Kyung Ryul Lee, Suwon-si (KR); Hyung Joon Jeon, Suwon-si (KR); Jin Woo Kim, Suwon-si (KR); Jong Suk Jeong, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 91 days.

(21) Appl. No.: 17/500,311

(22) Filed: Oct. 13, 2021

(65) Prior Publication Data

US 2022/0199326 A1    Jun. 23, 2022

(30) Foreign Application Priority Data

Dec. 18, 2020   (KR) ........................ 10-2020-0178791

(51) Int. Cl.
| | |
|---|---|
| *H01G 4/12* | (2006.01) |
| *C04B 35/468* | (2006.01) |
| *H01G 4/30* | (2006.01) |
| *H01G 4/012* | (2006.01) |

(52) U.S. Cl.
CPC ....... *H01G 4/1227* (2013.01); *C04B 35/4682* (2013.01); *H01G 4/012* (2013.01); *H01G 4/30* (2013.01); *C01P 2002/34* (2013.01); *C04B 2235/78* (2013.01)

(58) Field of Classification Search
None
See application file for complete search history.

(56) References Cited

U.S. PATENT DOCUMENTS

| | | | | |
|---|---|---|---|---|
| 6,437,969 B2* | 8/2002 | Mizuno | ................ | C01G 23/006 361/321.5 |
| 2001/0021095 A1* | 9/2001 | Mizuno | ................ | C01G 23/006 361/321.5 |
| 2003/0113446 A1* | 6/2003 | Hasegawa | ............ | C01G 45/006 427/372.2 |

(Continued)

FOREIGN PATENT DOCUMENTS

| | | |
|---|---|---|
| KR | 10-2003-0047826 A | 6/2003 |
| KR | 10-2018-0076628 A | 7/2018 |

(Continued)

*Primary Examiner* — Dion R. Ferguson
(74) *Attorney, Agent, or Firm* — Morgan, Lewis & Bockius LLP

(57) ABSTRACT

A ceramic electronic component includes: a body including dielectric layers and internal electrodes; and external electrodes disposed on the body and connected to the internal electrodes, wherein the dielectric layer includes a plurality of dielectric crystal grains, and at least one of the plurality of dielectric crystal grains has a core-double shell structure, the double shell includes a first shell surrounding at least a portion of the core and a second shell surrounding at least a portion of the first shell, the first shell includes a first element, one or more of Sn, Sb, Ge, Si, Ga, In, or Zr, and the second shell includes a second element, one or more of Ca or Sr.

38 Claims, 16 Drawing Sheets

(56) References Cited

U.S. PATENT DOCUMENTS

| | | | |
|---|---|---|---|
| 2014/0098455 A1* | 4/2014 | Kang | H01G 4/1227 501/137 |
| 2014/0098457 A1* | 4/2014 | Kang | H01G 4/008 501/137 |
| 2015/0098166 A1* | 4/2015 | Kang | C04B 35/4682 501/134 |
| 2016/0181019 A1* | 6/2016 | Park | H01G 4/12 361/301.4 |
| 2018/0182557 A1* | 6/2018 | Park | H01G 4/1227 |
| 2020/0176191 A1* | 6/2020 | Park | H01L 23/291 |
| 2021/0159013 A1* | 5/2021 | Chun | H01G 4/1218 |
| 2021/0210288 A1* | 7/2021 | Kang | C04B 35/62894 |
| 2021/0249192 A1* | 8/2021 | Kang | C04B 35/4682 |
| 2021/0304966 A1* | 9/2021 | Murakami | C04B 35/62807 |
| 2022/0199326 A1* | 6/2022 | Kim | C04B 35/62821 |

FOREIGN PATENT DOCUMENTS

| | | | | |
|---|---|---|---|---|
| KR | 2019121143 A | * | 10/2019 | ............ H01G 4/005 |
| KR | 20190121149 A | * | 10/2019 | |
| KR | 20220116106 A | * | 8/2022 | |

\* cited by examiner

CERAMIC ELECTRONIC COMPONENT

CROSS-REFERENCE TO RELATED APPLICATION(S)

This application claims benefit of priority to Korean Patent Application No. 10-2020-0178791 filed on Dec. 18, 2020 in the Korean Intellectual Property Office, the disclosure of which is incorporated herein by reference in its entirety.

BACKGROUND

1. Field

The present disclosure relates to a ceramic electronic component.

2. Description of Related Art

In general, ceramic electronic components using a ceramic material, such as a capacitor, an inductor, a piezoelectric element, a varistor, or a thermistor include a ceramic body formed of the ceramic material, internal electrodes formed in the ceramic body, and external electrodes installed on surfaces of the ceramic body to be connected to the internal electrodes.

A multilayer ceramic capacitor (MLCC), a ceramic electronic component, is a chip-type condenser mounted on a printed circuit board of several electronic products such as an image device, for example, a liquid crystal display (LCD), a plasma display panel (PDP) or the like, a computer, a smartphone, a mobile phone, and the like, to serve to charge or discharge electricity therein or therefrom.

The multilayer ceramic capacitor may be used as components of various electronic apparatuses since it has a small size, implements high capacitance, and may be easily mounted. In accordance with miniaturization and an increase in output of various electronic apparatuses such as computers and mobile devices, a demand for miniaturization and a capacitance increase of the multilayer ceramic capacitors has increased.

In order to achieve miniaturization and an increase in the capacitance of the multilayer ceramic capacitor, the numbers of stacked dielectric layers and internal electrodes need to be increased by decreasing thicknesses of the dielectric layers and the internal electrodes. Currently, the thickness of the dielectric layer has reached a level of about 0.6 μm, and a thickness decrease of the dielectric layer has been conducted.

In order to implement the thickness decrease of the dielectric layer, a technology of making dielectric crystal grains small and increasing grain boundary resistance of the dielectric crystal grains to suppress charge transfer is basically required.

In order to increase the grain boundary resistance of the dielectric crystal grains, a method of doping $BaTiO_3$ with an impurity element has generally been used. However, in such a method, there is a risk that dielectric properties will be deteriorated as compared with pure $BaTiO_3$.

SUMMARY

An aspect of the present disclosure may provide a ceramic electronic component of which reliability may be improved.

Another aspect of the present disclosure may provide a ceramic electronic component of which a dielectric constant is improved.

According to an aspect of the present disclosure, a ceramic electronic component may include: a body including dielectric layers and internal electrodes; and external electrodes disposed on the body and connected to the internal electrodes, wherein the dielectric layer includes a plurality of dielectric crystal grains, and at least one of the plurality of dielectric crystal grains has a core-double shell structure including a core and a double shell, the double shell includes a first shell surrounding at least a portion of the core and a second shell surrounding at least a portion of the first shell, the first shell includes one or more of a first element selected from the group consisting of Sn, Sb, Ge, Si, Ga, In, and Zr, and the second shell includes a second element of one or more of Ca or Sr.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
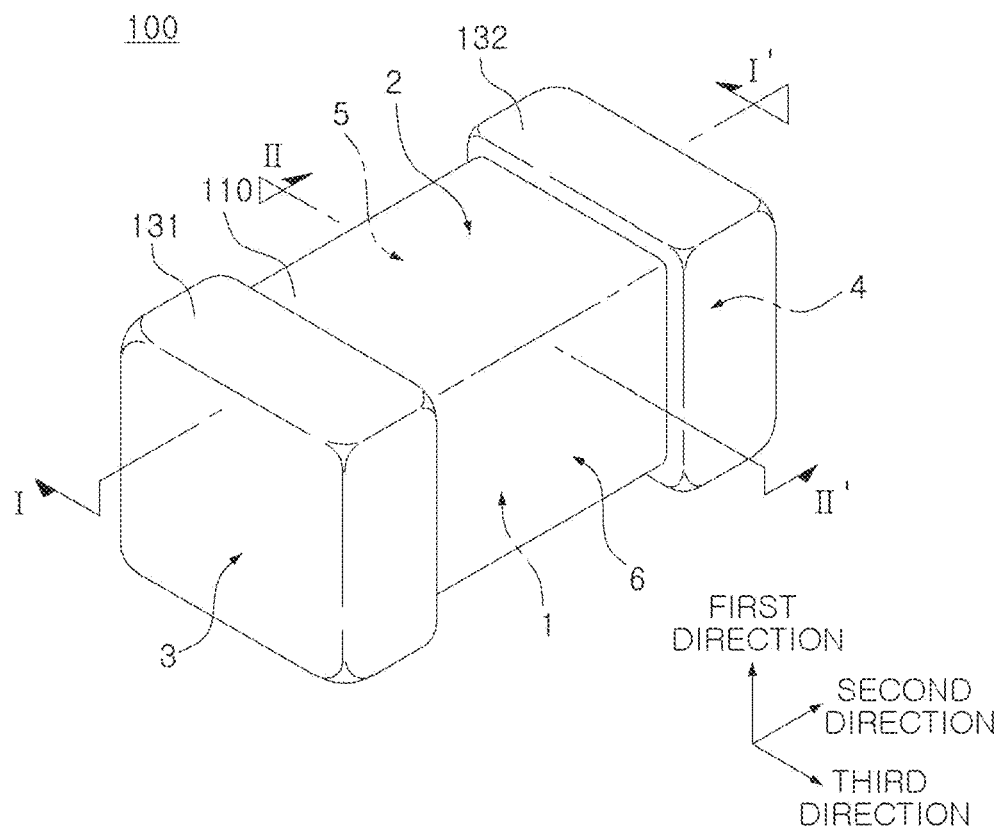
FIG. 1 is a schematic perspective view illustrating a ceramic electronic component according to an exemplary embodiment in the present disclosure.

Hereinafter, exemplary embodiments of the present disclosure will now be described in detail with reference to the accompanying drawings.

In the drawings, a first direction may be defined as a stacking direction or a thickness T direction, a second direction may be defined as a length L direction, and a third direction may be defined as a width W direction.

Ceramic Electronic Component

FIG. 1 is a schematic perspective view illustrating a ceramic electronic component according to an exemplary embodiment in the present disclosure.

Figure 2:
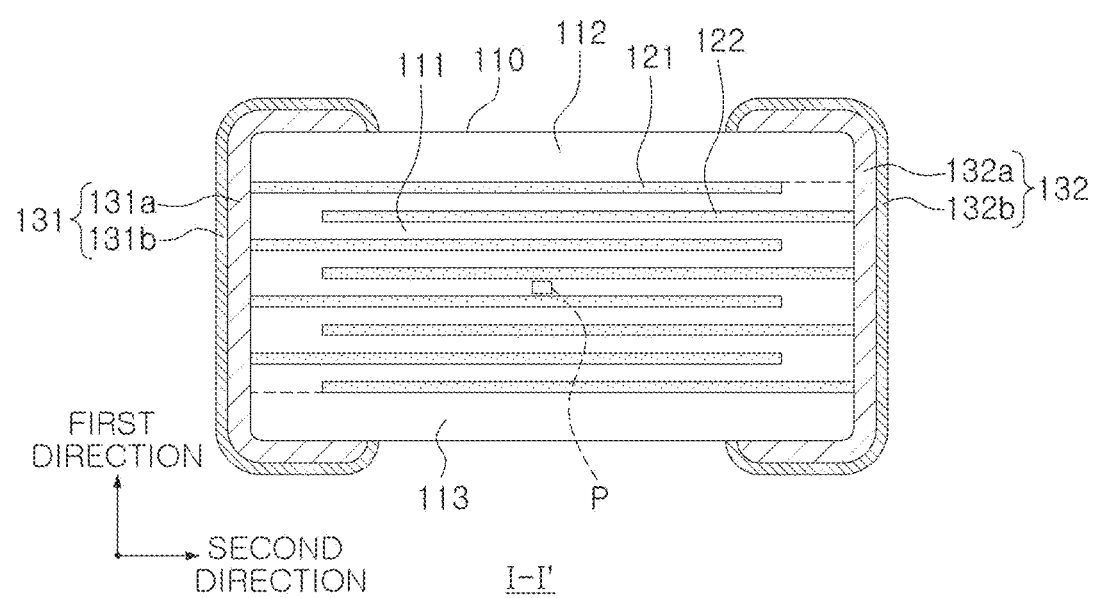
FIG. 2 is a schematic cross-sectional view taken along line I-I' of FIG. 1.

FIG. 2 is a schematic cross-sectional view taken along line I-I' of FIG. 1.

Figure 3:
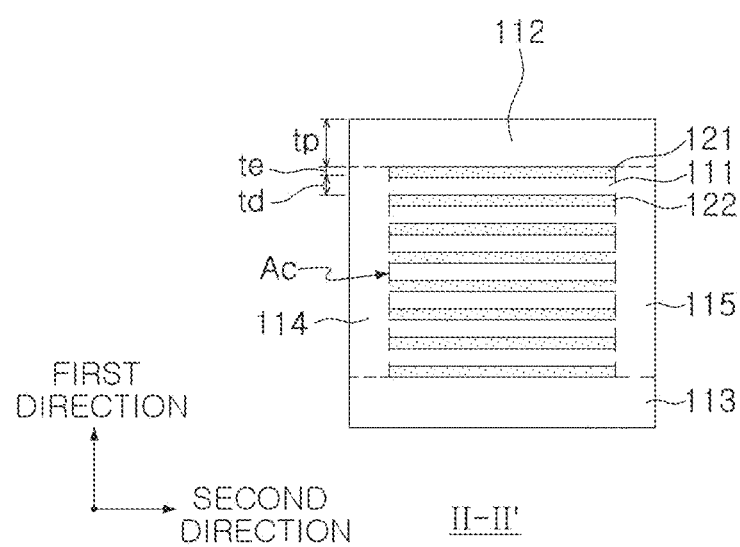
FIG. 3 is a schematic cross-sectional view taken along line II-II' of FIG. 1.

FIG. 3 is a schematic cross-sectional view taken along line II-II' of FIG. 1.

Figure 4:
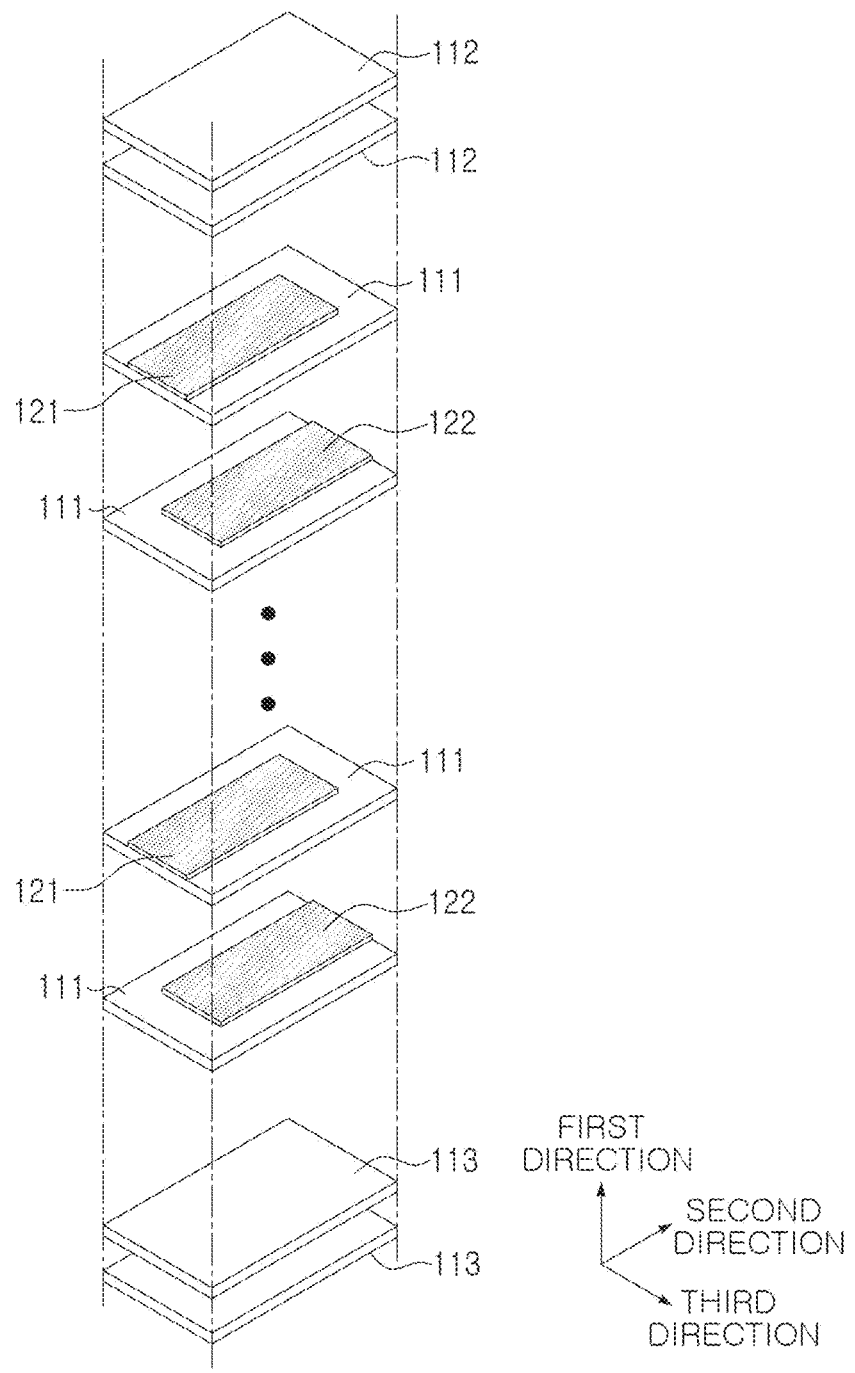
FIG. 4 is a schematic exploded perspective view illustrating a body in which dielectric layers and internal electrodes are stacked according to an exemplary embodiment in the present disclosure.

FIG. 4 is a schematic exploded perspective view illustrating a body in which dielectric layers and internal electrodes are stacked according to an exemplary embodiment in the present disclosure.

Figure 5:
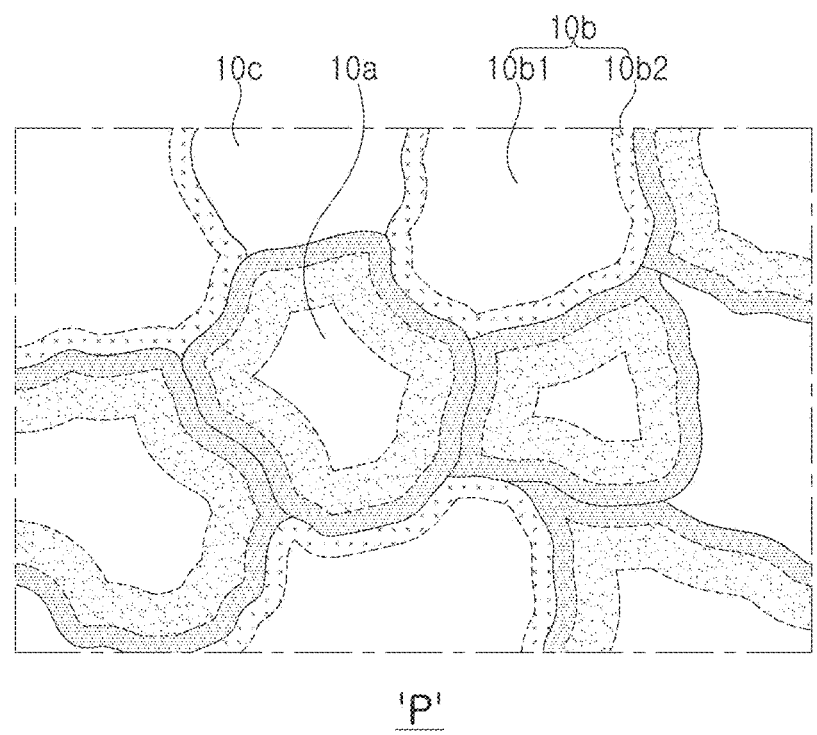
FIG. 5 is an enlarged view of region P of FIG. 2.

FIG. 5 is an enlarged view of region P of FIG. 2.

Figure 6:
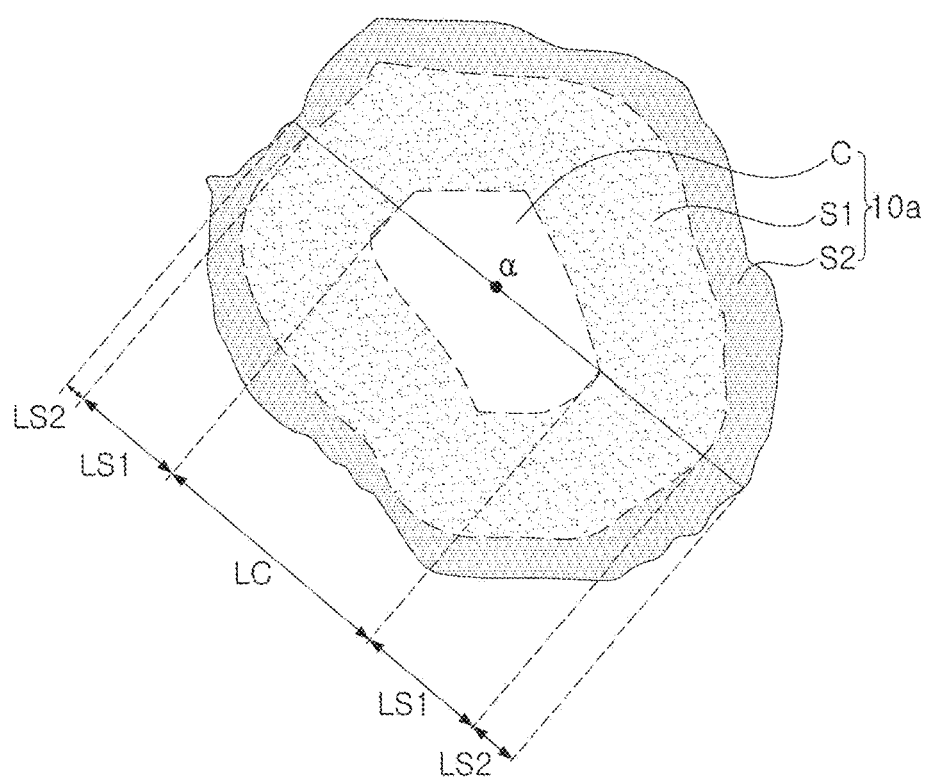
FIG. 6 is a schematic view illustrating a crystal grain having a core-double shell structure.

FIG. 6 is a schematic view illustrating a crystal grain having a core-double shell structure.

Hereinafter, a ceramic electronic component 100 according to an exemplary embodiment in the present disclosure will be described in detail with reference to FIGS. 1 through 6. In addition, a multilayer ceramic capacitor will be described as an example of the ceramic electronic component, but the present disclosure is not limited thereto, and may also be applied to various ceramic electronic components using a ceramic material, such as an inductor, a piezoelectric element, a varistor, or a thermistor. The use of the word "a" or "an" when used in conjunction with the term "comprising" may mean "one," but it is also consistent with the meaning of "one or more," "at least one." The word "about" means plus or minus 5% of the stated number.

The ceramic electronic component 100 according to an exemplary embodiment in the present disclosure may include: a body 110 including dielectric layers 111 and internal electrodes 121 and 122; and external electrodes 131 and 132 disposed on the body 110 and connected to the internal electrodes, wherein the dielectric layer includes a plurality of dielectric crystal grains 10a, 10b, and 10c, at least one of the plurality of dielectric crystal grains has a core-double shell structure including a core and a double shell, a double shell includes a first shell S1 surrounding at least a portion of a core C and a second shell S2 surrounding at least a portion of the first shell S1, the first shell includes a first element of one or more selected from the group consisting of Sn, Sb, Ge, Si, Ga, In, and Zr, and the second shell includes a second element of one or more of Ca or Sr.

The body 110 may include the dielectric layers 111 and the internal electrodes 121 and 122 alternately stacked therein.

A shape of the body 110 is not particularly limited, and may be a hexahedral shape or a shape similar to the hexahedral shape, as illustrated in the drawings. Although the body 110 does not have a hexahedral shape having perfectly straight lines due to shrinkage of ceramic powders included in the body 110 in a sintering process, the body 110 may have a substantially hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 may be in a sintered state, and adjacent dielectric layers 111 may be integrated with each other so that boundaries therebetween are not readily apparent without using a scanning electron microscope (SEM).

Referring to FIG. 5, the dielectric layer 111 may include the plurality of dielectric crystal grains 10a, 10b, and 10c, and at least one of the plurality of dielectric crystal grains may be a dielectric crystal grain 10a having a core-double shell structure.

Referring to FIG. 6, the dielectric crystal grain 10a having the core-double shell structure may include the first shell S1 surrounding at least a portion of the core C and the second shell S2 surrounding at least a portion of the first shell S1.

A multilayer ceramic capacitor (MLCC), one of the ceramic electronic components, tends to have high capacitance and a decreased thickness. In order to implement a thickness decrease of the dielectric layer, a technology of making dielectric crystal grains small and increasing grain boundary resistance of the dielectric crystal grains to suppress basic charge transfer is basically required. In order to increase the grain boundary resistance of the dielectric crystal grains, a method of doping $BaTiO_3$ with an impurity element has been generally used.

However, in such a method, there is a risk that dielectric properties will be deteriorated as compared with pure $BaTiO_3$, and when a thickness of the dielectric layer is significantly decreased in order for the multilayer ceramic capacitor to have higher capacitance, or a voltage becomes high due to a used environment of the multilayer ceramic capacitor that becomes harsher, such a method is not effective.

Therefore, in the present disclosure, at least one of the plurality of dielectric crystal grains may have the core-double shell structure including a core and a double shell, the double shell may include the first shell S1 surrounding at least a portion of the core C and the second shell S2 surrounding at least a portion of the first shell S1, the first shell may include one or more of the first element selected from the group consisting of Sn, Sb, Ge, Si, Ga, In, and Zr, and the second shell may include the second element of one or more of Ca or Sr, to improve reliability, dielectric properties and the like, of the ceramic electronic component.

The core C may serve to maintain a dielectric constant. The first and second elements may not exist in the core C, or only very small amounts of the first and second elements may exist in the core C even though the first and second elements exist in the core C. Therefore, the core C may be formed of pure $BaTiO_3$ in which impurities are not included, and may include $BaTiO_3$. The pure $BaTiO_3$ may generally have a dielectric constant higher than that of $BaTiO_3$ doped with an impurity element.

The first shell S1 may include one or more of the first element selected from the group consisting of Sn, Sb, Ge, Si, Ga, In, and Zr. The first element included in the first shell S1 may be doped to a B-site of $BaTiO_3$ to increase a band gap energy through which other rare earth, and doping elements are diffused into a crystal grain. Therefore, the first shell S1 may serve as a barrier suppressing the diffusion of other rare earth and doping elements into the crystal grain. In addition, the first shell S1 may serve to suppress growth of a dielectric crystal grain to contribute to grain refining of the dielectric crystal grain.

Sn included in the first shell S1 may be doped to the B-site of $BaTiO_3$, such that the first shell S1 may include $Ba(Ti, Sn)O_3$.

One or more of Ca or Sr included in the second shell S2 may be doped to an A-site of $BaTiO_3$ to serve to improve reliability and/or a dielectric constant. Ca of the second element may have a large effect of improving the reliability, and Sr of the second element may have a large effect of improving the dielectric constant.

One or more of Ca or Sr included in the second shell (S2) may be doped to the A-site of $BaTiO_3$, such that the second shell S2 may include one or more of $(Ba, Ca)TiO_3$ or $(Ba, Sr)TiO_3$.

In addition, since a concentration of the first element significantly changes at a boundary between the core C and the first shell S1, and a concentration of the second element significantly changes at a boundary between the first shell S1 and the second shell S2, the core C, the first shell S1, and the second shell S2 may be readily distinguished from each other, and may be confirmed through a transmission electron microscope-energy dispersive X-ray spectrometer (TEM-EDS) analysis.

Specifically, when an energy dispersive X-ray spectrometer (EDS) line analysis installed in a transmission electron microscope (TEM) is performed on a dielectric crystal grain of the dielectric layer positioned at the center of the body in the first and second directions in a cross section of the body cut in the first and second directions at the center of the body in the third direction to analyze the dielectric crystal grain from the center α of the dielectric crystal grain toward an outward direction of the dielectric crystal grain, the core C, the first shell S1, and the second shell S2 may be distinguished from each other using a portion in which the concentration of the first element starts to significantly increase as the boundary between the core C and the first shell S1 and using a portion in which the concentration of the second element starts to significantly increase as the boundary between the first shell S1 and the second shell S2.

As illustrated in FIGS. 5 and 6, the first shell S1 may be disposed to cover the entire surface of the core C, and the second shell S2 may be disposed to cover the entire surface of the first shell S1. However, in some embodiments, the first shell may not cover an entire surface of the core, and thus the first shell may not be disposed on a part of the surface of the core. In some embodiment, the second shell may not cover an entire surface of the first shell, and thus the second shell does not cover or disposed on a part of the surface of the first shell.

In some embodiments, the first shell S1 may be disposed to cover about 90 area % or more of the surface of the core, and the second shell S2 may be disposed to cover about 90 area % or more of the surface of the first shell S1. A reliability improving effect of the ceramic electronic component according to the present disclosure may be insufficient when the first shell S1 is disposed to cover an area % of less than about 90 area % of the surface of the core or the second shell S2 is disposed to cover an area % of less than about 90 area % of the surface of the first shell S1.

In an exemplary embodiment, $C1_{S1}$ may be higher than $C1_{S2}$ and $C1_C$, and $C2_{S2}$ may be higher than $C2_C$ and $C2_{S1}$ in which $C1_C$, $C1_{S1}$, and $C1_{S2}$ are concentrations (mol %) of the first element in the core C, the first shell S1, and the second shell S2, respectively, and $C2_C$, $C2_{S1}$, and $C2_{S2}$ are concentrations (mol %) of the second element in the core C, the first shell S1, and the second shell S2, respectively. That is, the core C, the first shell S1, and the second shell S2 may be distinguished from each other according to changes in the concentrations of the first element and the second element.

In addition, since the first element and the second element barely exist in the core C, and the second element barely exists in the first shell S1, $C1_C$ may be $0.01*C1_{S1}$ or less, and $C2_C$ and $C2_{S1}$ may be $0.01*C2_{S2}$ or less.

In an exemplary embodiment, $C2_{S2}/C1_{S1}$ may be 0.1 or more and 1.0 or less.

When $C2_{S2}/C1_{S1}$ is less than 0.1, a dielectric constant improving effect, a reliability improving effect, and the like, of the ceramic electronic component, may be insufficient. On the other hand, when $C2_{S2}/C1_{S1}$ exceeds 1.0 due to a very low amount of the first element, an effect of suppressing the diffusion of other rare earth and doping elements of the first shell into the crystal grain may be insufficient, and it may thus be difficult to implement the core-double shell structure.

In an exemplary embodiment, the second element may include Ca, and $C2_{S2}/C1_{S1}$ may be 0.55 or more and 1.0 or less. Therefore, the reliability improving effect of the ceramic electronic component due to the core-double shell structure may become more remarkable.

In an exemplary embodiment, the second element may include Sr, and $C2_{S2}/C1_{S1}$ may be 0.53 or more and 1.0 or less. Therefore, the dielectric constant improving effect of the ceramic electronic component due to the core-double shell structure may become more remarkable.

Meanwhile, a content of each of the first element and the second element does not need to be particularly limited. For example, the content of the first element included in the first shell may be about 0.5 to about 5 mol % based on the total amount of core-double shell structure, and the content of the second element included in the second shell may be from about 0.5 to about 5 mol % based on the total amount of core-double shell structure.

Specifically, when the content of the second element included in the second shell is less than 0.5 mol % based on the total amount of the core-double shell structure, the reliability improving effect and the dielectric constant improving effect of the ceramic electronic component due to the core-double shell structure may be insufficient, and when the content of the second element included in the second shell exceeds 5 mol % based on the entire core-double shell structure, the second element may be segregated and precipitated in a form of an oxide, such that there may be a risk that reliability of the ceramic electronic component will decrease. Meanwhile, the content of the first element included in the first shell may be adjusted in consideration of the effect of suppressing the diffusion of other rare earth and doping elements of the first shell into the crystal grain and the content of the second element included in the second shell.

In an exemplary embodiment, LS2/LS1 may be 00 0.1 or more and 1 or less in which LS1 is a length/thickness of the first shell S1 measured at a major axis passing through the center α of the core-double shell structure, and LS2 is a length/thickness of the second shell S2 measured at the major axis. The length of the first shell may be an average length measured from an image obtained by scanning a cross section of the body 110 in the length and thickness directions (L-T) with a scanning electron microscope (SEM).

When LS2/LS1 is less than 0.1, the dielectric constant improving effect, the reliability improving effect and the like of the ceramic electronic component may be insufficient. On the other hand, when LS2/LS1 exceeds 1.0 due to a very small amount of the first element, the effect of suppressing the diffusion of other rare earth and doping elements of the first shell S1 into the crystal grain may be insufficient, and it may thus be difficult to implement the core-double shell structure.

In an exemplary embodiment, the second element may include Ca, and LS2/LS1 may be 0.43 or more and 1 or less. Therefore, the reliability improving effect of the ceramic electronic component due to the core-double shell structure may become more remarkable.

In an exemplary embodiment, the second element may include Sr, and LS2/LS1 may be 0.38 or more and 1 or less. Therefore, the dielectric constant improving effect of the ceramic electronic component due to the core-double shell structure may become more remarkable.

In an exemplary embodiment, LS1 may be about 4 to about 100 nm.

When LS1 is less than 4 nm, an effect of suppressing the growth of the crystal grain, the effect of suppressing the diffusion of other rare earth and doping elements of the first shell S1 into the crystal grain may be insufficient. On the other hand, when LS1 exceeds 100 nm, dielectric properties may decrease.

In an exemplary embodiment, LS2 may be 2 to 60 nm.

When LS2 is less than 2 nm, the dielectric constant improving effect, the reliability improving effect and the like of the ceramic electronic component may be insufficient, and when LS2 is more than 60 nm, the second element may be segregated and precipitated in the form of oxide, such that there may be a risk that the reliability of the ceramic electronic component will decrease.

LC may be about 10 to about 200 nm in which LC is a length of the core measured at the major axis passing through the center of the core-double shell structure.

Meanwhile, a manufacturing method for implementing the dielectric crystal grain having the core-double shell structure does not need to be particularly limited.

For example, first, $BaTiO_3$ corresponding to the core C may be primarily synthesized using a hydrothermal synthesis method. Then, in a secondary synthesis process, $SnO_2$ may be added and a grain may be then grown to form the first shell S1 including Sn at a high concentration. Then, in a tertiary synthesis process, one or more of Ca or Sr may be added and a grain may be then grown to obtain a dielectric powder in which the second shell S2 including one or more of Ca or Sr at a high concentration is formed. Then, the dielectric layer may be formed using a dielectric composition in which various additives, organic solvents, binders, dispersants, and the like, are added to the dielectric powder.

Referring to FIG. 5, the dielectric layer 111 may include a dielectric crystal grain 10b having a core-shell structure in addition to the dielectric crystal grain 10a having the core-double shell structure. Therefore, at least one of the plurality of dielectric crystal grains may be the dielectric crystal grain 10b having the core-shell structure. The dielectric crystal grains 10b having the core-shell structure may include a core 10b1 and a shell 10b2 surrounding at least a portion of the core 10b1.

In addition, the dielectric layer 111 may include a dielectric crystal grain 10c that does not have a separate shell.

In some embodiments, a ratio of the number of dielectric crystal grains 10a having the core-double shell structure to the number of dielectric crystal grains 10a, 10b, and 10c may be 50% or more. Here, the ratio of the number of dielectric crystal grains having the core-double shell structure to the numbers of dielectric crystals 10a, 10b, and 10c may be measured from an image obtained by scanning a cross section of the dielectric layer with a transmission electron microscope (TEM).

When the ratio of the number of dielectric crystal grains having the core-double shell structure to the numbers of dielectric crystals 10a, 10b, and 10c is less than 50%, the reliability improving effect and the dielectric constant improving effect of the ceramic electronic component may be insufficient.

Meanwhile, a grain size of the dielectric crystal grains does not need to be particularly limited. For example, an average grain size of the dielectric crystal grains may be about 50 nm or more and about 300 nm or less.

When the average grain size is less than 50 nm, it may be difficult to implement capacitance of the ceramic electronic component due to a decrease in a dielectric constant, and when the average grain size exceeds 300 nm, there may be a risk that a capacitance change rate of ceramic electronic component according to a temperature and a direct current (DC) voltage will increase, and there may be a risk that reliability of the ceramic electronic component may decrease due to a decrease in the number of dielectric crystal grains per dielectric layer.

The body 110 may include a capacitance forming portion Ac disposed in the body 110 and forming capacitance by including first internal electrodes 121 and second internal electrodes 122 disposed to face each other with each of the dielectric layers 111 interposed therebetween and cover portions 112 and 113 formed on upper and lower surfaces of the capacitance forming portion Ac in the first direction, respectively.

In addition, the capacitance forming portion Ac, which contributes to forming capacitance of a multilayer ceramic capacitor, may be formed by repeatedly stacking a plurality of first and second internal electrodes 121 and 122 with each of the dielectric layers 111 interposed therebetween.

The cover portions 112 and 113 may include an upper cover portion 112 disposed on the upper surface of the capacitance forming portion Ac in the first direction and a lower cover portion 113 disposed on the lower surface of the capacitance forming portion Ac in the first direction.

The upper cover portion 112 and the lower cover portion 113 may be formed by stacking a single dielectric layer or two or more dielectric layers on the upper and lower surfaces of the capacitance forming portion Ac, respectively, in the thickness direction (the first direction), and may basically serve to prevent damage to the internal electrodes due to physical or chemical stress.

The upper cover portion 112 and the lower cover portion 113 may not include the internal electrodes, and may include the same or different material as the dielectric layer 111.

That is, the upper cover portion 112 and the lower cover portion 113 may include a ceramic material such as a barium titanate ($BaTiO_3$)-based ceramic material.

Meanwhile, a thickness of each of the cover portions 112 and 113 does not need to be particularly limited. However, the thickness tp of each of the cover portions 112 and 113 may be about 20 μm or less in order to more easily achieve the miniaturization and the increase in capacitance of the ceramic electronic component.

In addition, margin portions 114 and 115 may be disposed on side surfaces of the capacity forming portion Ac.

The margin portions 114 and 115 may include a margin portion 114 disposed on the fifth surface 5 of the body 110 and a margin portion 115 disposed on the sixth surface 6. That is, the margin portions 114 and 115 may be disposed on opposite side surfaces of the ceramic body 110 in the width direction (the third direction).

The margin portions 114 and 115 refer to regions between both distal ends of the first and second internal electrodes 121 and 122 and boundary surfaces of the body 110 in a cross section of the body 110 cut in the width-thickness (W-T) direction, as illustrated in FIG. 3.

The margin portions 114 and 115 may basically serve to prevent damage to the internal electrodes due to physical or chemical stress.

The margin portions 114 and 115 may be formed by applying a conductive paste onto ceramic green sheets except for places where the margin portions are to be formed to form the internal electrodes. The margin portions 114 and 115 may not include the internal electrodes, and may include the same or different material as the dielectric layer 111.

Alternatively, in order to suppress a step due to the internal electrodes 121 and 122, the margin portions 114 and 115 may be formed by stacking ceramic green sheets to form a laminate, cutting the laminate so that the internal electrodes are exposed to the fifth and sixth surfaces 5 and 6 of the body, and then stacking a single dielectric layer or two or more dielectric layers on opposite side surfaces of the capacitance forming portion Ac in the width direction (the third direction).

Meanwhile, a thickness td of the dielectric layer 111 does not need to be particularly limited.

However, in general, when the dielectric layer is formed to have a small thickness less than 0.6 μm, in particular, when a thickness of the dielectric layer is 0.55 μm or less, there may be a risk that the reliability of the ceramic electronic component will decrease.

The dielectric layer 111 may include the dielectric crystal grain 10a having the core-double shell structure to secure the dielectric constant improving effect, the reliability improving effect and the like of the ceramic electronic component as described above, and excellent reliability of the ceramic electronic component may thus be secured even when the thickness td of the dielectric layer 111 is 0.55 μm or less.

Therefore, when the thickness td of the dielectric layer 111 is 0.55 μm or less, the reliability improving effect of the ceramic electronic component according to the present disclosure may become more remarkable.

The thickness td of the dielectric layer 111 may refer to an average thickness of the dielectric layer 111 disposed between the first and second internal electrodes 121 and 122.

The average thickness of the dielectric layer 111 may be measured from an image obtained by scanning a cross section of the body 110 in the length and thickness directions (L-T) with a scanning electron microscope (SEM).

For example, with respect to any dielectric layer extracted from an image obtained by scanning a cross section of the body 110 in the first and second directions (the length and thickness directions) cut in a central portion of the body 110 in the third direction (the width W direction) with the scanning electron microscope (SEM), thicknesses of the dielectric layer may be measured at thirty points arranged at equal intervals in the length direction to obtain an average value of the measured thicknesses.

The thicknesses of the dielectric layer measured at the thirty points arranged at the equal intervals may be measured in the capacitance forming portion Ac referring to a region in which the first and second internal electrodes 121 and 122 overlap each other.

The internal electrodes 121 and 122 may be disposed alternately with the dielectric layer 111.

The internal electrodes 121 and 122 may include first and second internal electrodes 121 and 122. The first and second internal electrodes 121 and 122 may be alternately disposed to face each other with each of the dielectric layers 111 constituting the body 110 interposed therebetween, and may be exposed to the third and fourth surfaces 3 and 4 of the body 110, respectively.

Referring to FIG. 2, the first internal electrodes 121 may be spaced apart from the fourth surface 4 and be exposed through the third surface 3, and the second internal electrodes 122 may be spaced apart from the third surface 3 and be exposed through the fourth surface 4.

In this case, the first and second internal electrodes 121 and 122 may be electrically separated from each other by each of the dielectric layers 111 disposed therebetween.

Referring to FIG. 4, the body 110 may be formed by alternately stacking ceramic green sheets on which the first internal electrode 121 is printed and ceramic green sheets on which the second internal electrode 122 is printed and then sintering the stacked ceramic green sheets.

A material of each of the internal electrodes 121 and 122 is not particularly limited, and may be a material having excellent electrical conductivity. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), or alloys thereof.

In addition, the internal electrodes 121 and 122 may be formed by printing a conductive paste for an internal electrode including one or more of nickel (Ni), copper (Cu), palladium (Pd), silver (Ag), gold (Au), platinum (Pt), tin (Sn), tungsten (W), titanium (Ti), or alloys thereof on ceramic green sheets. A method of printing the conductive paste for an internal electrode may be a screen printing method, a gravure printing method or the like, but is not limited thereto.

Meanwhile, a thickness te of each of the internal electrodes 121 and 122 does not need to be particularly limited.

However, in general, when the internal electrode is formed to have a low thickness less than about 0.6 μm, in particular, when a thickness of the internal electrode is about 0.55 μm or less, there may be a risk that the reliability of the ceramic electronic component will decrease.

The dielectric layer 111 may include the dielectric crystal grain 10a having the core-double shell structure to secure the dielectric constant improving effect, the reliability improving effect and the like of the ceramic electronic component as described above, and excellent reliability of the ceramic electronic component may thus be secured even when the thickness te of each of the internal electrodes 121 and 122 is 0.55 μm or less.

Therefore, when the thickness te of each of the internal electrodes 121 and 122 is 0.55 μm or less, the effect of the ceramic electronic component according to the present disclosure may be more remarkable, and miniaturization and a capacitance increase of the ceramic electronic component may be more easily achieved.

The thickness te of each of the internal electrodes 121 and 122 may refer to an average thickness of each of the first and second internal electrodes 121 and 122.

The average thickness of each of the internal electrodes 121 and 122 may be measured from an image obtained by scanning a cross section of the body 110 in length and thickness directions (L-T) with a scanning electron microscope (SEM).

For example, with respect to any internal electrodes 121 and 122 extracted from an image obtained by scanning a cross section of the body 110 in the first and second directions (the length and thickness directions) cut in a central portion of the body 110 in the third direction (the width W direction) with the scanning electron microscope (SEM), thicknesses of the internal electrode may be measured at thirty points arranged at equal intervals in the length direction to obtain an average value of the measured thicknesses.

The thirty points arranged at the equal intervals may be measured in the capacitance forming portion Ac referring to a region in which the internal electrodes 121 and 122 overlap each other.

The external electrodes 131 and 132 may be disposed on the third surface 3 and the fourth surface 4 of the body 110, respectively.

The external electrodes 131 and 132 may include first and second external electrodes 131 and 132 disposed on the third and fourth surfaces 3 and 4 of the body 110, respectively, and connected to the first and second internal electrodes 121 and 122, respectively.

Referring to FIG. 1, the external electrodes 131 and 132 may be disposed to cover opposite end surfaces of the side margin portions 114 and 115 in the second direction, respectively.

A structure in which the ceramic electronic component 100 includes two external electrodes 131 and 132 has been described in the present exemplary embodiment, but the number, shapes or the like, of external electrodes 131 and 132 may be changed depending on shapes of the internal electrodes 121 and 122 or other purposes.

Meanwhile, the external electrodes 131 and 132 may be formed of any material having electrical conductivity, such as a metal, a specific material of each of the external electrodes 131 and 132 may be determined in consideration of electrical characteristics, structural stability and the like, and the external electrodes 131 and 132 may have a multi-layer structure.

For example, the external electrodes 131 and 132 may include, respectively, electrode layers 131a and 132a disposed on the body 110, and plating layers 131b and 132b each disposed on the electrode layers 131a and 132a.

As a more specific example of the electrode layers 131a and 132a, the electrode layers 131a and 132a may be sintered electrodes including a conductive metal and glass or resin-based electrodes including a conductive metal or a resin.

Alternatively, the electrode layers 131a and 132a may have a form in which sintered electrodes and resin electrodes are sequentially formed on the body. In addition, the electrode layers 131a and 132a may be formed in a manner of transferring a sheet including a conductive metal onto the body or be formed in a manner of transferring a sheet including a conductive metal onto a sintered electrode.

The conductive metal included in the electrode layers 131a and 132a may be a material having excellent electrical connectivity, but is not particularly limited thereto. For example, the conductive metal may be one or more of nickel (Ni), copper (Cu), or alloys thereof.

The plating layers 131b and 132b may serve to improve mounting characteristics of the ceramic electronic component. A type of the plating layers 131b and 132b is not particularly limited. That is, each of the plating layers 131b and 132b may be a plating layer including one or more of Ni, Sn, Pd, or alloys thereof, and may be formed as a plurality of layers.

As a more specific example of the plating layers 131b and 132b, the plating layers 131b and 132b may include Ni plating layers or Sn plating layers, may have a form in which Ni plating layers and Sn plating layers are sequentially formed on the electrode layers 131a and 132a, respectively, or may have a form in which Sn plating layers, Ni plating layers, and Sn plating layers are sequentially formed. Alternatively, the plating layers 131b and 132b may include a plurality of Ni plating layers and/or a plurality of Sn plating layers.

A size of the ceramic electronic component 100 does not need to be particularly limited.

However, since the numbers of stacked dielectric layers and internal electrodes need to be increased by decreasing thicknesses of the dielectric layers and the internal electrodes in order to achieve both of the miniaturization and the capacitance increase of the ceramic electronic component, a reliability improving effect and an insulation resistance improving effect according to the present disclosure in a ceramic electronic component 100 having a size of 0402 (length×width: 0.4 mm×0.2 mm) or less may become more remarkable.

Therefore, considering a manufacturing error, sizes of external electrodes, and the like, when a length of the ceramic electronic component 100 is about 0.44 mm or less and a width of the ceramic electronic component 100 is about 0.22 mm or less, the reliability improving effect according to the present disclosure may become more remarkable. Here, the length of the ceramic electronic component 100 may refer to a maximum size of the ceramic electronic component 100 in the second direction, and the width of the ceramic electronic component 100 may refer to a maximum size of the ceramic electronic component 100 in the third direction.

INVENTIVE EXAMPLE

First, $BaTiO_3$ corresponding to the core C was primarily synthesized using a hydrothermal synthesis method. Then, in a secondary synthesis process, $SnO_2$ was added and a grain was then grown to form the first shell S1 including Sn at a high concentration, and in a tertiary synthesis process, a second element shown in Table 1 was added and a grain was then grown to obtain a dielectric powder in which the second shell S2 including Ca or Sr at a high concentration was formed. Then, accessory components were added to the dielectric powder, were mixed with a dispersant using ethanol and toluene as solvents, and were then mixed with a binder to prepare a ceramic sheet. A Ni electrode was printed on the produced ceramic sheet, the ceramic sheets on which the Ni electrode is printed were stacked to form a laminate, the laminate was compressed and cut to manufacture a chip, and the chip was burned out and then sintered for removing the binder to prepare a sample chip.

At the time of preparing the dielectric powder, contents of $SnO_2$ and the second element were made to be different for each Test number, and in a case of Test No. 11, a $BaTiO_3$ powder was used as the dielectric powder.

LC, LS1, LS2, and $C2_{S2}/C1_{S1}$ were measured through a TEM-EDS line analysis for dielectric crystal grains having a core-double shell structure, included in dielectric layers of Test Nos. 1 to 10 and were shown in Table 1. In addition, dielectric constants and reliability of the prepared sample chips were evaluated and shown in Table 1.

An analysis using a transmission electron microscope (TEM) and an energy dispersive X-ray spectrometer (EDS) device was performed on a crystal grain having a core-double shell structure, included in a dielectric layer positioned at the center of each sample chip in the first and second directions in a cross section of each sample chip cut in the first and second directions in a central portion of each sample chip in the third direction (the width direction).

A TEM-EDS line analysis was performed on a major axis passing through the center a of the core-double shell structure to measure intensity values (counts) for each of a first element (Sn) and a second element (Ca or Sr). The core C, the first shell S1, and the second shell S2 were distinguished from each other using a portion in which a concentration of the first element starts to significantly increase as a boundary between the core C and the first shell S1 and using a portion in which a concentration of the second element starts to significantly increase as a boundary between the first shell S1 and the second shell S2, and LC, LS1, and LS2 were shown in Table 1 in which LC is a length of a region corresponding to the core C, LS1 is the sum of lengths of both sides corresponding to the first shell S1, and LS2 is the sum of lengths of both sides corresponding to the second shell S2.

In addition, a value of $C2_{S2}/C1_{S1}$ was calculated by determining averages of intensity values (counts) of the first and second elements in the core C as noise, using a value obtained by subtracting the average of the intensity values (the counts) of the first element in the core C from an average of intensity values (counts) of the first element in the first shell S1 $C1_{S1}$, and using a value obtained by subtracting the average of the intensity values (the counts) of the second element in the core C from an average of intensity values (counts) of the second element in the second shell S2 $C2_{S2}$.

A dielectric constant was evaluated by a temperature coefficient of capacitance (TCC) measurement. For each Test No., dielectric constants of three sample chips were measured while changing a temperature from −55° C. to 150° C., and values of dielectric constants corresponding to 50° C. are shown in Table 1.

Reliability was evaluated by a highly accelerated life test (HALT). For each Test No., a voltage 1.2 times higher than a reference voltage (1 Vr=6.3 V) was applied to 100 sample chips at 150° C. for 24 hours to determine sample chips in which a short circuit occurred as defective samples, and defective rates were shown in Table 1.

Figure 7:
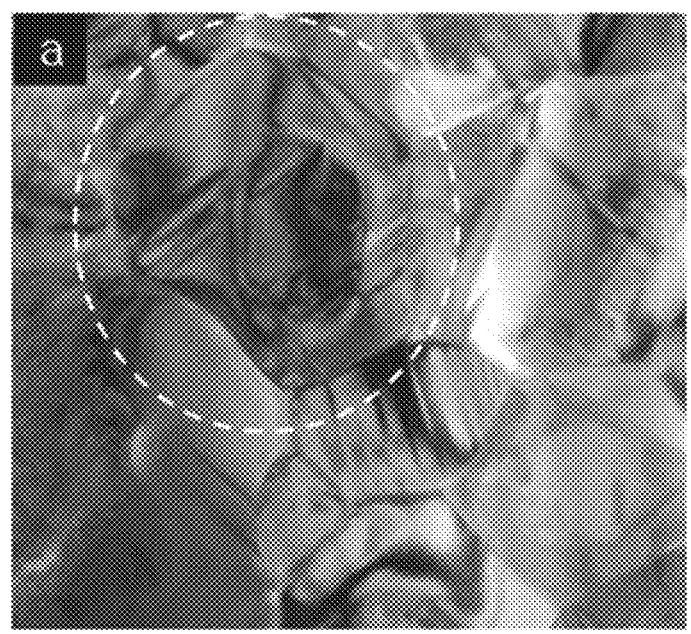
FIGS. 7 and 8 are images obtained by scanning a cross section of the dielectric layer according to an exemplary embodiment in the present disclosure with a transmission electron microscope (TEM)
Figure 8:
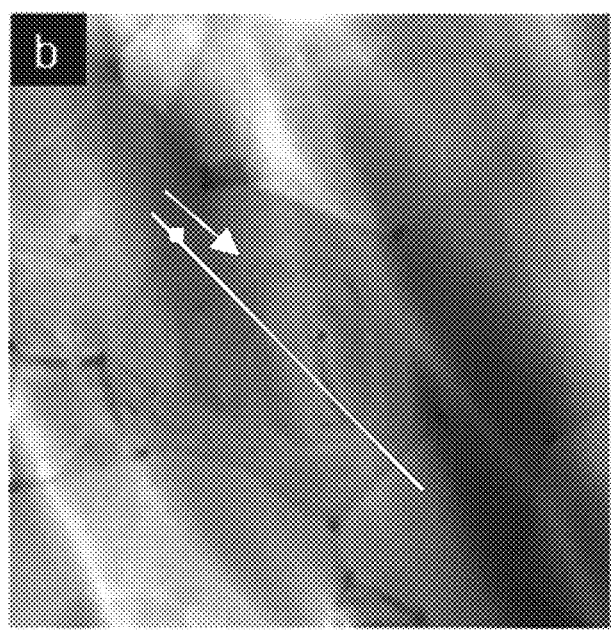

FIGS. 7 and 8 are images obtained by scanning a cross section of the dielectric layer according to an exemplary embodiment in the present disclosure with a transmission electron microscope.

Figure 9:
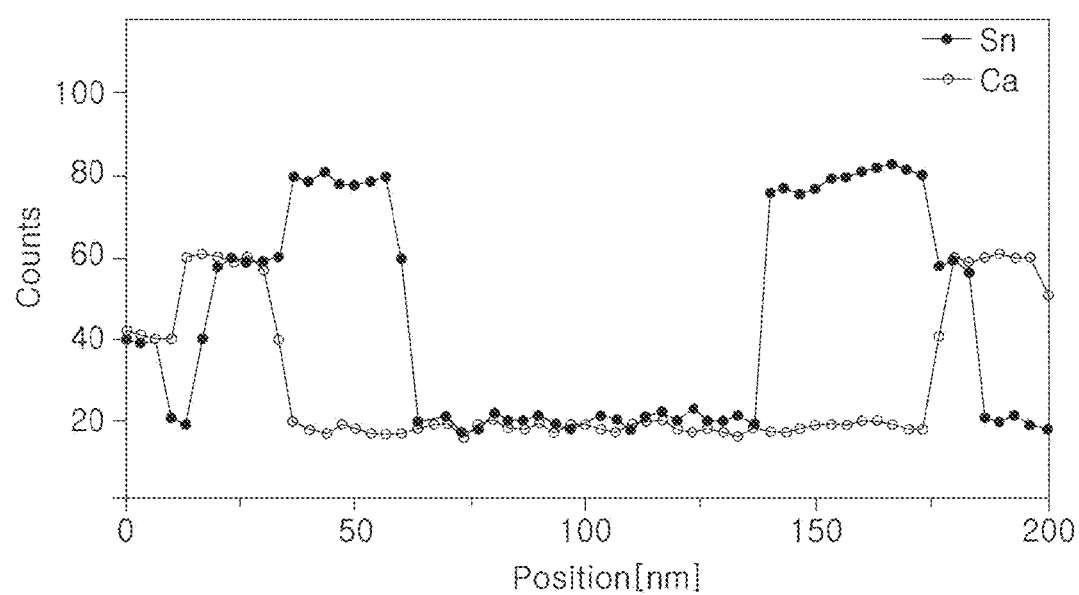
FIG. 9 is a graph illustrating a transmission electron microscope-energy dispersive X-ray spectrometer (TEM-EDS) line analysis result of a crystal grain having a core-double shell of Test No. 4.
Figure 10:
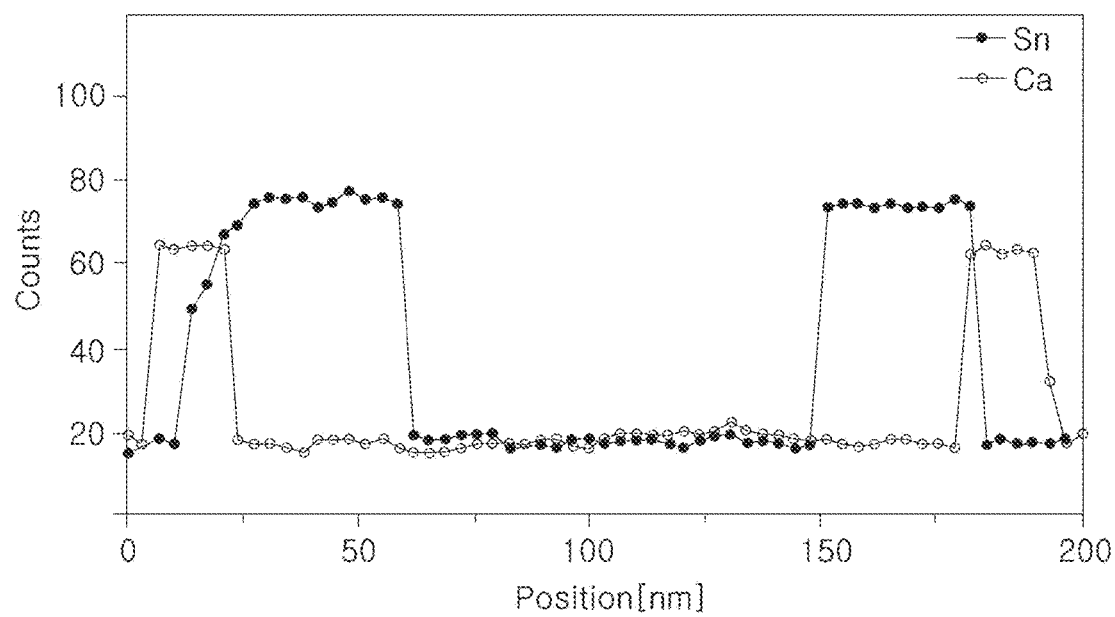
FIG. 10 is a graph illustrating a TEM-EDS line analysis result of a crystal grain having a core-double shell of Test No. 2.
Figure 11:
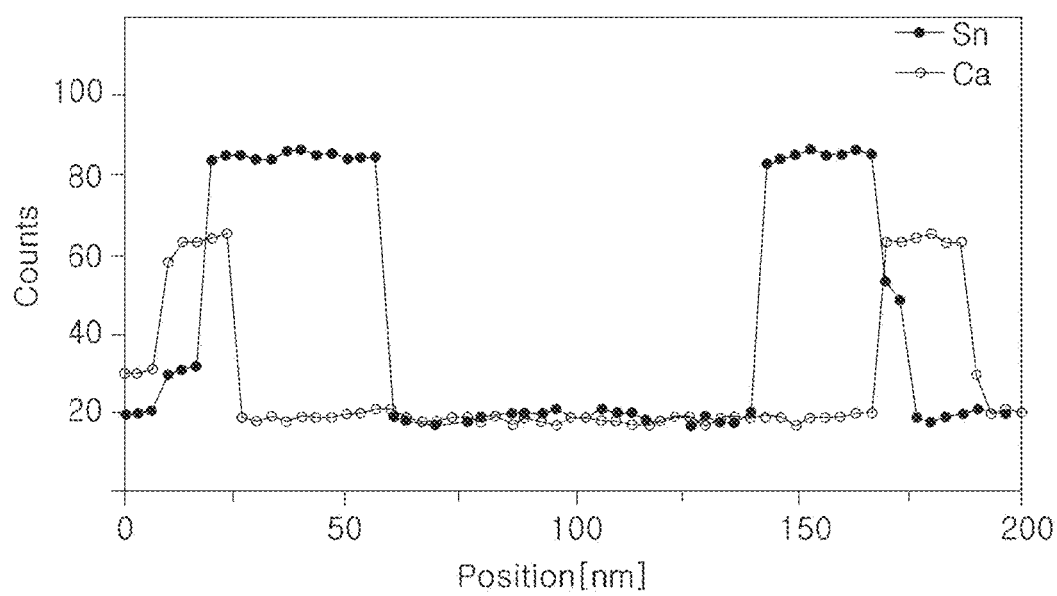
FIG. 11 is a graph illustrating a TEM-EDS line analysis result of a crystal grain having a core-double shell of Test No. 5.
Figure 12:
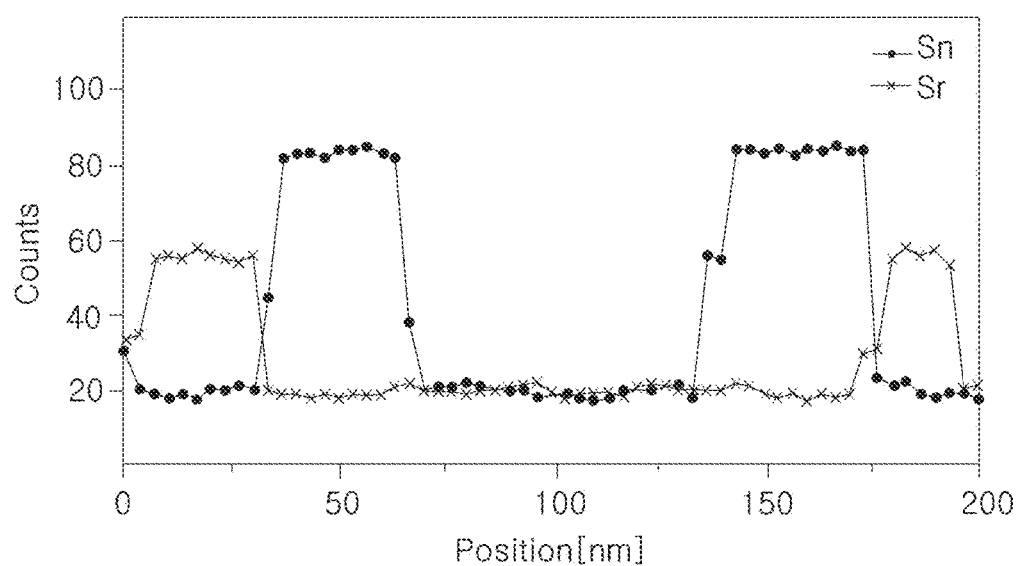
FIG. 12 is a graph illustrating a TEM-EDS line analysis result of a crystal grain having a core-double shell of Test No. 9.
Figure 13:
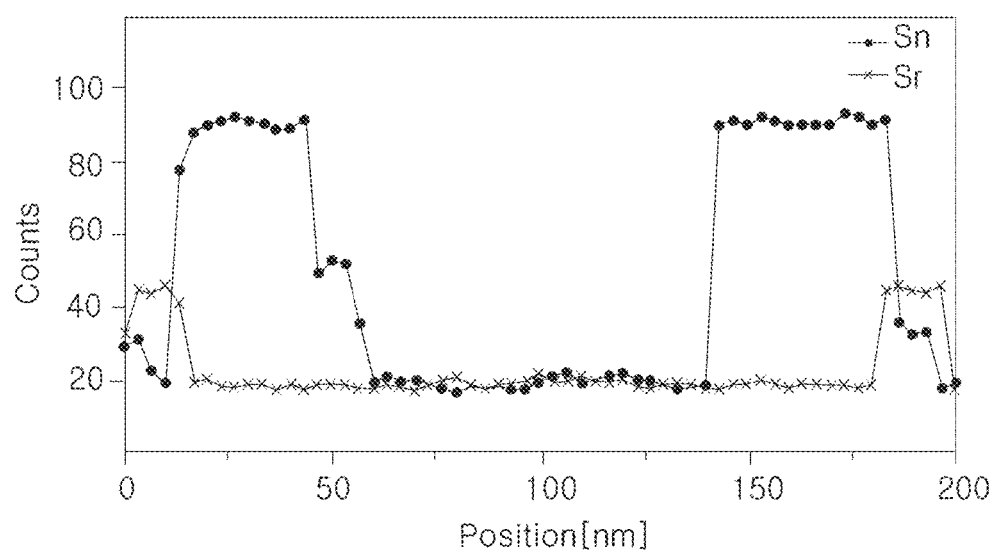
FIG. 13 is a graph illustrating a TEM-EDS line analysis result of a crystal grain having a core-double shell of Test No. 10.
Figure 14:
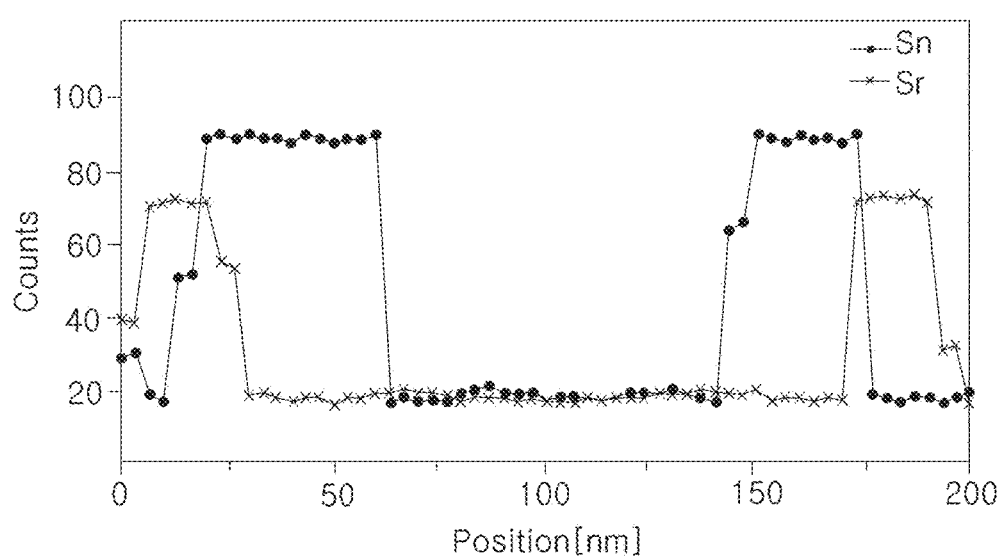
FIG. 14 is a graph illustrating a TEM-EDS line analysis result of a crystal grain having a core-double shell of Test No. 8.

A crystal grain in a region represented by a circle in FIG. 7 corresponds to the dielectric crystal grain having the core-double shell structure. It is difficult to distinguish a double shell from the images of FIGS. 7 and 8. Referring to FIG. 9 illustrating a result of performing a line analysis with an EDS along a line drawn in FIG. 8, it can be seen that the core C, the first shell S1, and the second shell S2 are clearly distinguished from each other.

In addition, it can also be seen that the core C, the first shell S1, and the second shell S2 are clearly distinguished from each other in FIGS. 10 through 14 illustrating results of performing the line analysis with the EDS on Test Nos. 2, 5, 8, 9, and 10 in such a manner.

Figure 15:
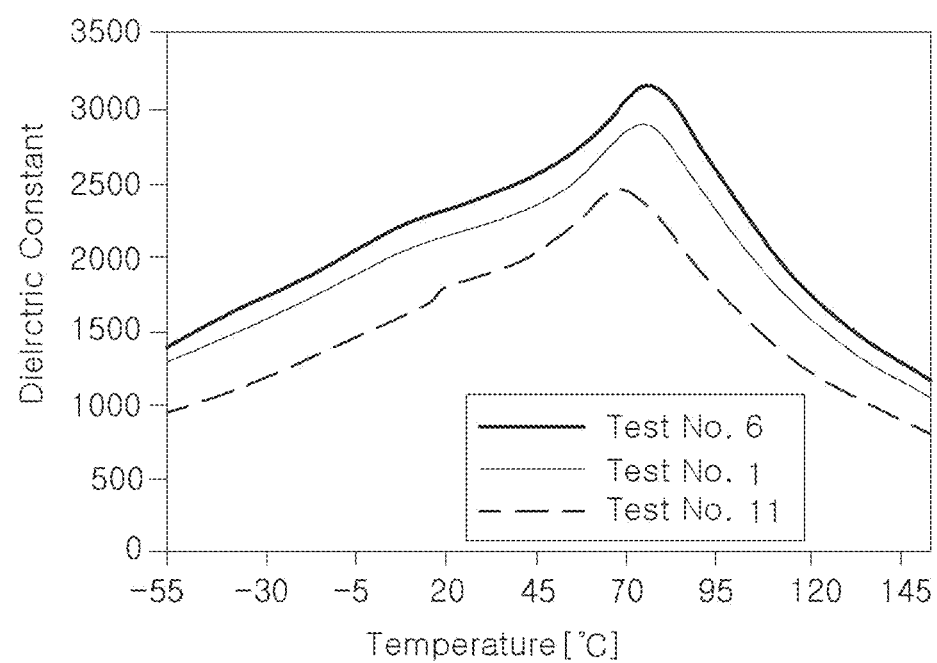
FIG. 15 is graphs illustrating dielectric constants according to a temperature for Test Nos. 1, 6, and 11.

FIG. 15 is graphs illustrating dielectric constants according to a temperature for Test Nos. 1, 6 and 11.

Referring to FIG. 15, it can be seen that Test Nos. 1 and 6 including a dielectric crystal grain having a core-double shell structure have dielectric constants higher than that of Test No. 11, and Curie temperatures Tc at which dielectric constant characteristics change also increase in Test Nos. 1 and 6 as compared with Test No. 11.

Figure 16A:
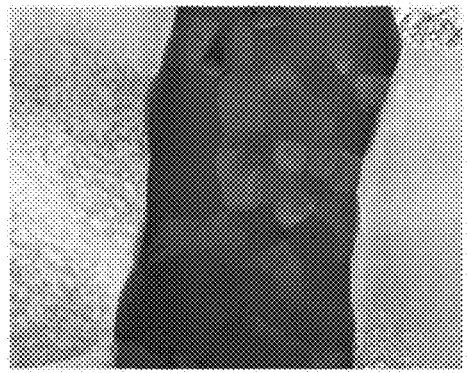
FIG. 16A is an image obtained by scanning a dielectric layer of Test No. 9 with a TEM.
Figure 16B:
FIG. 16B is a mapping image for a Sn element.
Figure 16C:
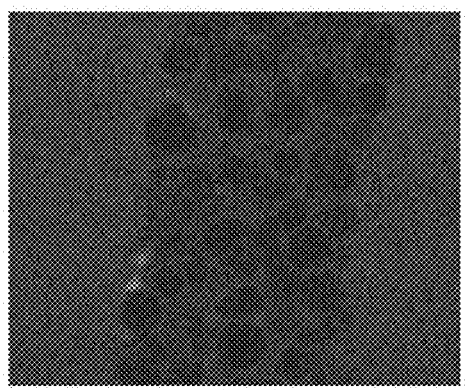
FIG. 16C is a mapping image for a Sr element.
Figure 16D:
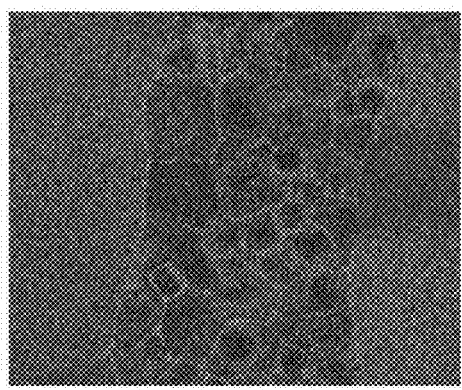
FIG. 16D is an image obtained by synthesizing the images of FIGS. 16B and 16C to each other so that the image of FIG. 16B is superimposed on the image of FIG. 16C.

In addition, FIG. 16A is an image obtained by scanning a dielectric layer of Test No. 9 with a TEM, FIG. 16B is a mapping image for a Sn element, FIG. 16C is a mapping image for a Sr element, and FIG. 16D is an image obtained by synthesizing the images of FIGS. 16B and 16C to each other so that the image of FIG. 16B is superimposed on the image of FIG. 16C. It can be seen that a ratio of the number of dielectric crystal grains having the core-double shell structure to the total number of dielectric crystal grains is 50% or more.

As set forth above, according to an exemplary embodiment in the present disclosure, at least one of the plurality of dielectric crystal grains may have the core-double shell structure, such that the reliability of the ceramic electronic component may be improved.

TABLE 1

| Test No. | 1 | 2 | 3 | 4 | 5 | 6 | 7 | 8 | 9 | 10 | 11* |
|---|---|---|---|---|---|---|---|---|---|---|---|
| Second Element | Ca | Ca | Ca | Ca | Ca | Sr | Sr | Sr | Sr | Sr | — |
| LS2/LS1 | 0.27 | 0.46 | 0.43 | 0.51 | 0.48 | 0.52 | 0.38 | 0.48 | 0.46 | 0.26 | — |
| $C2_{S2}/C1_{S1}$ | 0.35 | 0.59 | 0.55 | 0.66 | 0.63 | 0.74 | 0.53 | 0.68 | 0.66 | 0.33 | — |
| LC (nm) | 81.51 | 82.4 | 79.92 | 76.84 | 76.59 | 76.52 | 79.61 | 75.81 | 74.68 | 81.53 | — |
| LS1 (nm) | 75.18 | 73.26 | 91.84 | 91.44 | 75.42 | 72.38 | 86.28 | 81.84 | 79.42 | 93.86 | — |
| LS2 (nm) | 20.06 | 33.68 | 39.14 | 46.62 | 35.86 | 37.84 | 32.68 | 39.44 | 36.92 | 24.38 | — |
| Dielectric Constant | 2467 | 2516 | 2491 | 2527 | 2549 | 2647 | 2513 | 2553 | 2547 | 2459 | 2154 |
| Reliability | 38% | 17% | 20% | 2% | 8% | 15% | 38% | 29% | 32% | 41% | 53% |

It can be seen that all of Test Nos. 1 to 10 include a dielectric crystal grain having a core-double shell structure to have dielectric constants and reliability more excellent than those of Test No. 11.

In addition, it can be seen that Test Nos. 2 to 5 in which the second element is Ca and $C2_{S2}/C1_{S1}$ is 0.55 or more have more excellent reliability.

In addition, it can be seen that Test Nos. 6 to 9 in which the second element is Sr and $C2_{S2}/C1_{S1}$ is 0.53 or more have more excellent dielectric constants.

In addition, in the core-double shell structure, the first element, one or more of Sn, Sb, Ge, Si, Ga, In, and Zr, may be included in the first shell, and the second element, one or more of Ca and Sr, may be included in the second shell, such that a high dielectric constant and/or high reliability of the ceramic electronic component may be secured.

While exemplary embodiments have been shown and described above, it will be apparent to those skilled in the art that modifications and variations could be made without departing from the scope of the present invention as defined by the appended claims.

What is claimed is:

1. A ceramic electronic component comprising:
a body including dielectric layers and internal electrodes; and
external electrodes disposed on the body and connected to the internal electrodes,
wherein the dielectric layer includes a plurality of dielectric crystal grains,
at least one of the plurality of dielectric crystal grains has a core-double shell structure comprising a core and a double shell,
the double shell of the core-double shell structure includes a first shell surrounding at least a portion of the core and a second shell surrounding at least a portion of the first shell,
the first shell includes one or more of a first element selected from the group consisting of Sn, Sb, Ge, Si, Ga, In, and Zr, and
the second shell includes a second element of one or more of Ca or Sr.

2. The ceramic electronic component of claim 1, wherein $C1_{S1}$ is higher than $C1_{S2}$ and $C1_C$, and $C2_{S2}$ is higher than $C2_C$ and $C2_{S1}$ in which $C1_C$, $C1_{S1}$, and $C1_{S2}$ are concentrations (mol %) of the first element in the core, the first shell, and the second shell, respectively based on a total amount of dielectric crystal grain having the core-double shell structure, and $C2_C$, $C2_{S1}$, and $C2_{S2}$ are concentrations (mol %) of the second element in the core, the first shell, and the second shell, respectively based on a total amount of dielectric crystal grain having the core-double shell structure.

3. The ceramic electronic component of claim 2, wherein $C1_C$ is $0.01*C1_{S1}$ or less, and $C2_C$ and $C2_{S1}$ are $0.01*C2_{S2}$ or less.

4. The ceramic electronic component of claim 2, wherein $C2_{S2}/C1_{S1}$ is 0.1 or more and 1.0 or less.

5. The ceramic electronic component of claim 2, wherein the first element comprises Sn, and the second element comprises Ca, and
$C2_{S2}/C1_{S1}$ is 0.55 or more and 1.0 or less.

6. The ceramic electronic component of claim 2, wherein the first element comprises Sn, and the second element comprises Sr, and
$C2_{S2}/C1_{S1}$ is 0.53 or more and 1.0 or less.

7. The ceramic electronic component of claim 1, wherein LS2/LS1 is 0.1 or more and 1 or less in which LS1 is a length of the first shell measured at a major axis passing through a center of the core-double shell structure, and LS2 is a length of the second shell measured at the major axis.

8. The ceramic electronic component of claim 7, wherein the first element comprises Sn, and the second element comprises Ca, and
S2/LS1 is 0.43 or more and 1 or less.

9. The ceramic electronic component of claim 7, wherein the first element comprise Sn and the second element is Sr, and
LS2/LS1 is 0.38 or more and 1 or less.

10. The ceramic electronic component of claim 7, wherein LS1 is 4 to 100 nm.

11. The ceramic electronic component of claim 7, wherein LS2 is 2 to 60 nm.

12. The ceramic electronic component of claim 7, wherein LC is 10 to 200 nm in which LC is a length of the core measured at the major axis passing through the center of the core-double shell structure.

13. The ceramic electronic component of claim 1, wherein the core includes $BaTiO_3$,
the first shell includes $Ba(Ti, Sn)O_3$, and
the second shell includes one or more of $(Ba, Ca)TiO_3$ and $(Ba, Sr)TiO_3$.

14. The ceramic electronic component of claim 1, wherein a content of the first element included in the first shell is 0.5 to 5 mol % based on a total amount of the core-double shell structure, and
a content of the second element included in the second shell is 0.5 to 5 mol % based on a total amount of the core-double shell structure.

15. The ceramic electronic component of claim 1, wherein in the core-double shell structure, the first shell is disposed to cover 90 area % or more of a surface of the core, and
the second shell is disposed to cover 90 area % or more of a surface of the first shell.

16. The ceramic electronic component of claim 1, wherein at least one of the plurality of dielectric crystal grains has a core-shell structure.

17. The ceramic electronic component of claim 1, wherein a ratio of a number of dielectric crystal grains having the core-double shell structure to a number of dielectric crystal grains in the dielectric component is 50% or more.

18. The ceramic electronic component of claim 1, wherein an average grain size of the dielectric crystal grains of the dielectric layer is 50 nm or more and 300 nm or less.

19. The ceramic electronic component of claim 1, wherein an average thickness of the dielectric layer is 0.55 μm or less.

20. The ceramic electronic component of claim 1, wherein an average thickness of the internal electrode is 0.45 μm or less.

21. The ceramic electronic component of claim 1, wherein a concentration (mol %) of Sn in the first shell is more than twice of a concentration (mol %) of Sn in the core.

22. The ceramic electronic component of claim 1, wherein a concentration (mol %) of Ca in the second shell is more than twice of a concentration (mol %) of Ca in the core.

23. The ceramic electronic component of claim 1, wherein a concentration (mol %) of Sr in the second shell is more than twice of a concentration (mol %) of sr in the core.

24. A dielectric crystal grain having a core-double shell structure, wherein the core-double shell structure includes a core, a first shell dispose at least a portion of the core, and a second shell dispose at a portion of the first shell,
the core includes $BaTiO_3$,
the first shell includes one or more of a first element selected from the group consisting of Sn, Sb, Ge, Si, Ga, In, and Zr, and
the second shell includes a second element of Ca or Sr.

25. The ceramic electronic component of claim 24, wherein $C1_{S1}$ is higher than $C1_{S2}$ and $C1_C$, and $C2_{S2}$ is higher than $C2_C$ and $C2_{S1}$ in which $C1_C$, $C1_{S1}$, and $C1_{S2}$ are concentrations (mol %) of the first element in the core, the first shell, and the second shell, respectively based on a total amount of dielectric crystal grain having the core-double shell structure, and $C2_C$, $C2_{S1}$, and $C2_{S2}$ are concentrations (mol %) of the second element in the core, the first shell, and the second shell, respectively based on a total amount of dielectric crystal grain having the core-double shell structure.

26. The ceramic electronic component of claim 24, wherein the first element comprises Sn.

27. The ceramic electronic component of claim 24, wherein the second element is Ca.

28. The dielectric crystal grain of claim 24, wherein the first shell includes $Ba(Ti, Sn)O_3$, and
the second shell includes one or more of $(Ba, Ca)TiO_3$ and $(Ba, Sr)TiO_3$.

29. The dielectric crystal grain of claim 24, wherein a content of the first element included in the first shell is 0.5 to 5 mol % based on a total amount of the core-double shell structure, and
a content of the second element included in the second shell is 0.5 to 5 mol % based on a total amount of the core-double shell structure.

30. A ceramic electronic component comprising:
a body including dielectric layers and internal electrodes; and
external electrodes disposed on the body and connected to the internal electrodes,
wherein the dielectric layer includes a plurality of dielectric crystal grains,
at least one of the plurality of dielectric crystal grains has a core-double shell structure comprising a core and a double shell,
the double shell of the core-double shell structure includes a first shell surrounding at least a portion of the core and a second shell surrounding at least a portion of the first shell,
the first shell includes one or more of a first element selected from the group consisting of Sn, Sb, Ge, Si, Ga, In, and Zr, and
a concentration (mol %) of the first element in the first shell is more than twice of a concentration (mol %) of the first element in the core.

31. The ceramic electronic component of claim 30, wherein the second shell includes a second element of Ca, and
a concentration (mol %) of Ca in the second shell is more than twice of a concentration (mol %) of Ca in the core.

32. The ceramic electronic component of claim 30, wherein the second shell includes a second element of Sr, and
a concentration (mol %) of Sr in the second shell is more than twice of a concentration (mol %) of Sr in the core.

33. The ceramic electronic component of claim 30, wherein LS2/LS1 is 0.1 or more and 1 or less in which LS1 is a length of the first shell measured at a major axis passing through a center of the core-double shell structure, and LS2 is a length of the second shell measured at the major axis.

34. The ceramic electronic component of claim 33, wherein LS1 is 4 to 100 nm.

35. The ceramic electronic component of claim 33, wherein LS2 is 2 to 60 nm.

36. The ceramic electronic component of claim 33, wherein LC is 10 to 200 nm in which LC is a length of the core measured at the major axis passing through the center of the core-double shell structure.

37. The ceramic electronic component of claim 30, wherein the core includes $BaTiO_3$,
the first shell includes $Ba(Ti, Sn)O_3$, and
the second shell includes one or more of $(Ba, Ca)TiO_3$ and $(Ba, Sr)TiO_3$.

38. The ceramic electronic component of claim 30, wherein the first element includes Sn, and
a concentration (mol %) of Sn in the first shell is more than twice of a concentration (mol %) of Sn in the core.

* * * * *